Aug. 25, 1970   H. TANNENBERGER ETAL   3,525,646
BATTERY OF FUEL CELLS OF SOLID ELECTROLYTE
AND THE PROCESS OF MAKING THESE
Filed Aug. 29, 1968
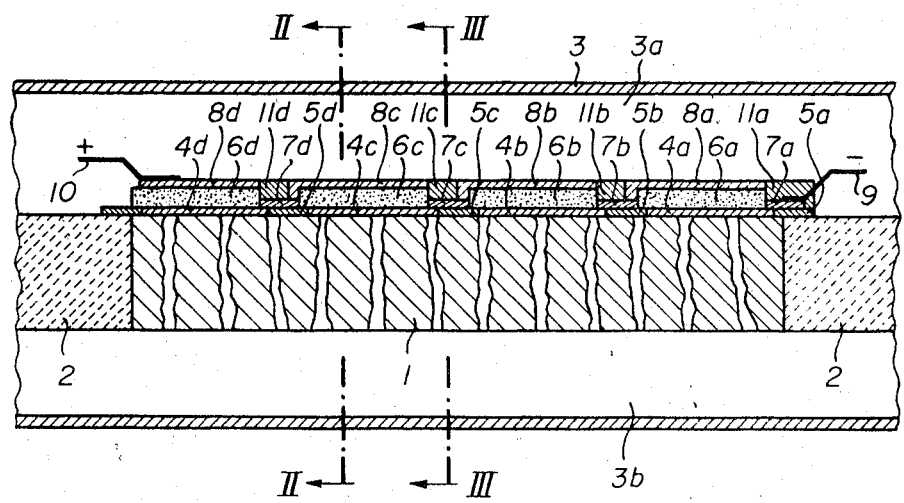
FIG. 1
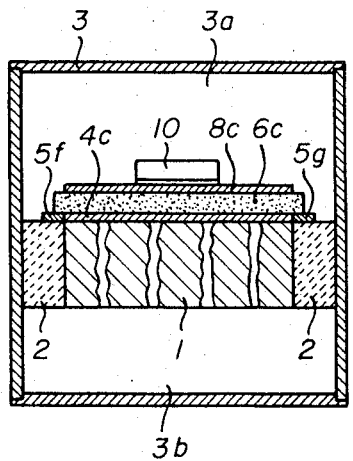   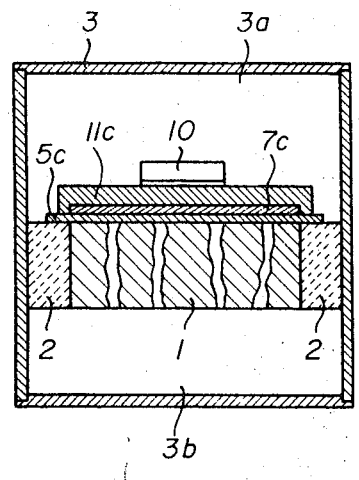
FIG. 2            FIG. 3

United States Patent Office 3,525,646
Patented Aug. 25, 1970

3,525,646
BATTERY OF FUEL CELLS OF SOLID ELECTROLYTE AND THE PROCESS OF MAKING THESE
Helmut Tannenberger, Geneva, and Reimar Schmitt, Chene-Bougeries, Geneva, Switzerland, assignors to Compagnie Francaise de Raffinage, Paris, France
Filed Aug. 29, 1968, Ser. No. 756,258
Claims priority, application Switzerland, Aug. 31, 1967, 12,226/67; July 19, 1968, 10,884/68; July 22, 1968, 10,978/68
Int. Cl. H01m 27/00
U.S. Cl. 136—86
20 Claims

ABSTRACT OF THE DISCLOSURE

A battery of fuel cells is provided which comprises a porous, insulated support; a first layer with components of an electronically conductive material forming a plurality of electrodes, each electrode being separated from the next adjacent electrode, and with components of a gas-tight, electronically non-conductive material between adjacent electrodes circumferentially isolating each electrode; a second layer with components of an electrolyte for each cell, each of said electrolytes overlaying the electrode of each of the corresponding cells and a part of the non-conductive components of said first layer, with components of an electronically conductive gas-tight material overlaying a major portion of said non-conductive, insulating components of said first layer and the minor portion not covered by said electrolyte; a third layer of an electronically conductive material covering the major part of the electrolyte for each cell in the second layer, said third layer forming the second electrode for said cell, said electrode partially also overlaying the electronically conductive components of said second layer; a terminal for each of the electrodes; and a surface of said insulated, porous support defining at least a part of one conduit. A method is also provided whereby the various layers are deposited on the support in a precisely delineated manner when using a plasma torch spray gun.

Figure 4:
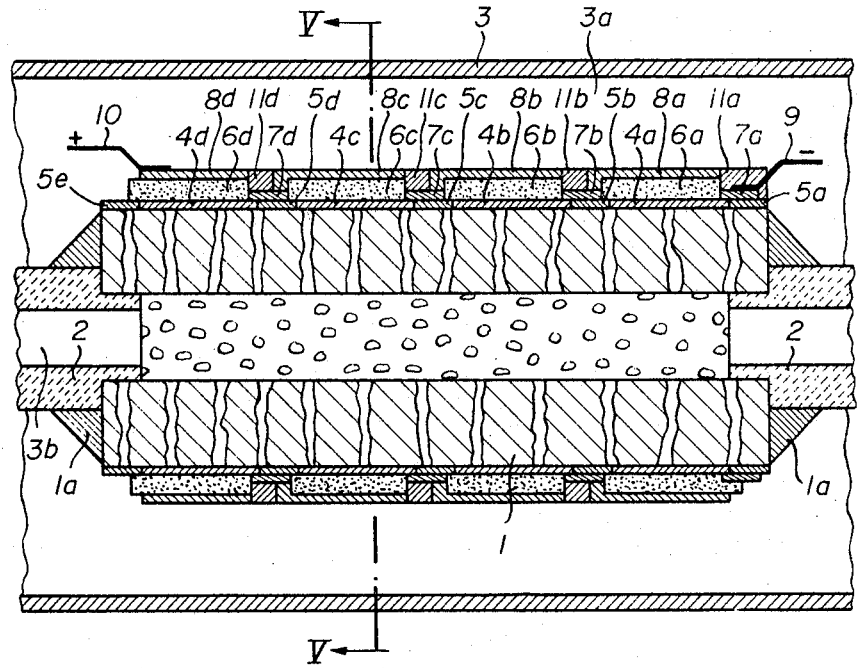

This invention relates to a fuel cell, more particularly this invention pertains to a battery of fuel cells with solid electrolyte and a method for producing said batteries.

Fuel cells with solid electrolyte in which the electrolyte is present in the form of a layer of small thickness are known. Thus, electrolyte layers of e.g., a few tenths of a mm. are known; these have the advantage of having a low internal resistance and, hence, do not cause any great ohmic losses. For example, such fuel cells with solid electrolyte in a thin layer are described in Swiss Pat. 415,773.

The open circuit voltage of these cells is of the order of 1.1 volt; and if it is desired to obtain a higher voltage, therefore, it is necessary to place several cells in series so as to produce a battery of cells.

The placing in series of solid-electrolyte fuel cells raises in general problems which are difficult to solve. In particular, it is necessary to effect connections between ceramic materials and metals or alloys, that is to say, between materials having very different physical and mechanical properties, especially with regard to their behavior at high temperatures. As a result, it is very difficult to connect solid-electrolyte fuel cells in series by junctions or joints which will be gas-tight and have sufficient mechanical strength under the practical use-conditions of these cells.

Of various solutions which have been proposed to allegedly solve these problems, one particular proposal consists in partially nesting in each other, cells of tubular shape. In these cells, the electrolyte itself constitutes the body of each tube, said electrolyte being covered on the inner face of the tube by a metal constituting the anode and on the outer face by a metal which constitutes the cathode. The anode of each cell is in electrical contact with the cathode of the following cell via a material which is a good conductor of electrons and also forms a gas-tight junction or joint, said junction has to withstand the corrosive action of the combustion supporting agent (comburant) and fuel at high temperature.

It is clear that not only is the production of such a junction difficult (its making impossible in practice industrial scale manufacture of batteries comprising cells connected in series in this manner), but also, in addition, this junction constitutes a weak point considerably reducing the mechanical strength of the assembly and requiring the taking of considerable precautions both in order to avoid any mechanical stress and any thermal shock (sudden change in temperature). These precautions are scarcely compatible with the requirements fuel cells must satisfy in actual practice.

Furthermore, as it is the electrolyte itself which constitutes the body of each cell, it is obvious that the thickness of the said electrolyte cannot be thinned too drastically without injuring the strength of the assembly. Furthermore, since the resistivity of the solid electrolytes used in industry is high, the ohmic losses are substantial.

Thus, the object of the present invention is to provide a battery of fuel cells in which the ohmic losses (i.e., resistance) are very low due to the extremely slight thickness of the electrolyte, but which battery nevertheless has excellent rigidity and mechanical strength as well as a particularly good resistance to thermal shock.

Figure 5:
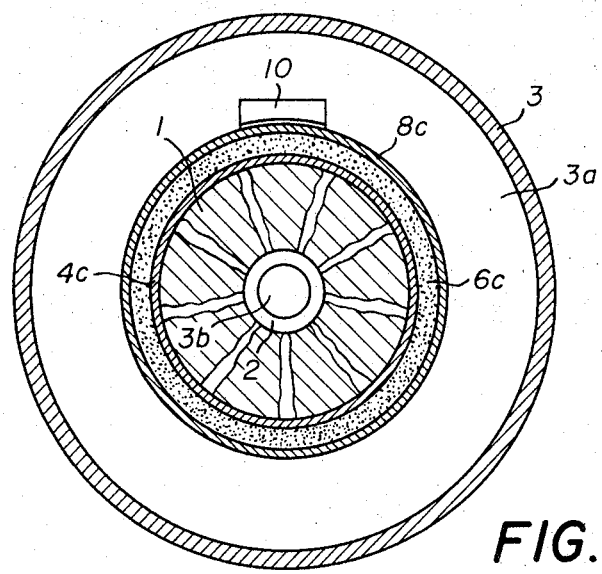
Figure 6:
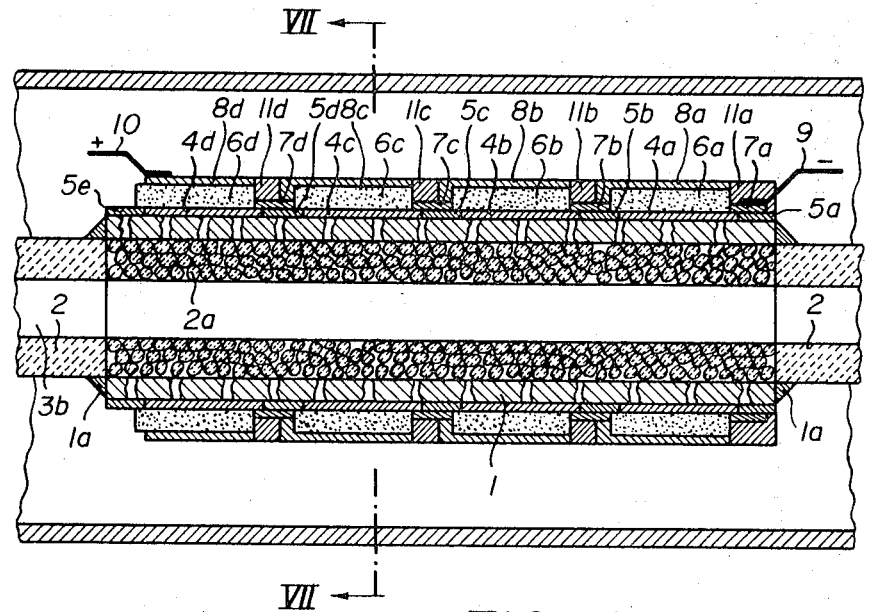
Figure 7:
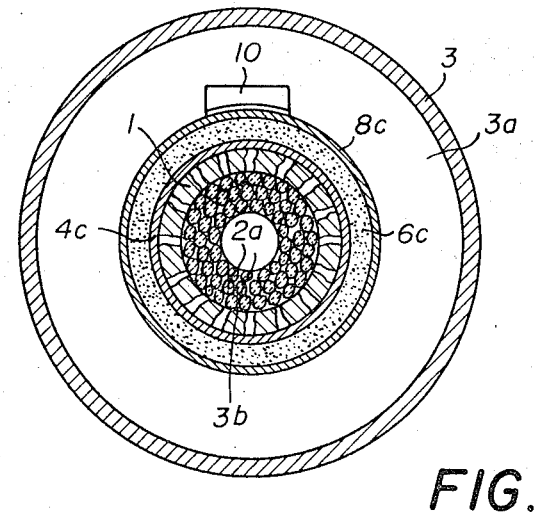
Figure 8:
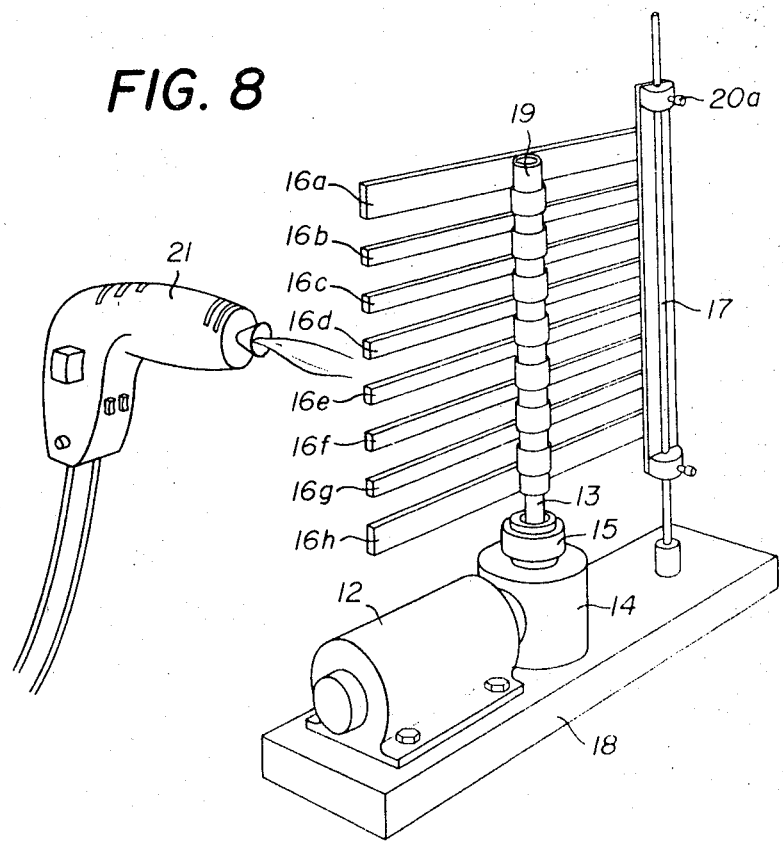
Figure 9:
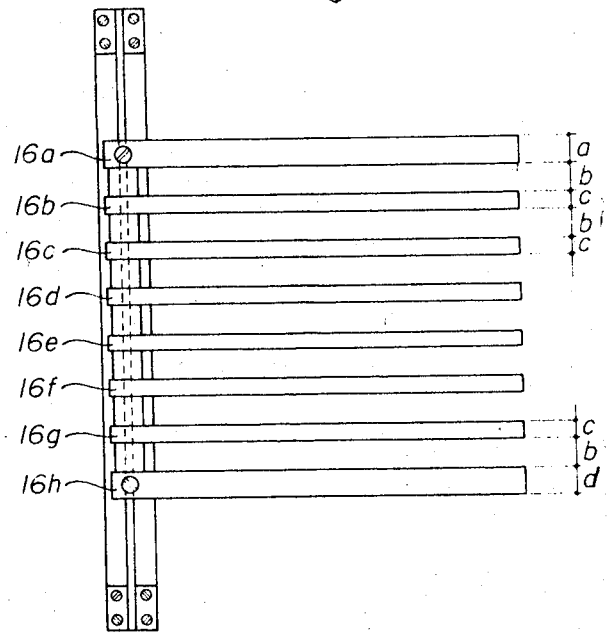
Figure 10:
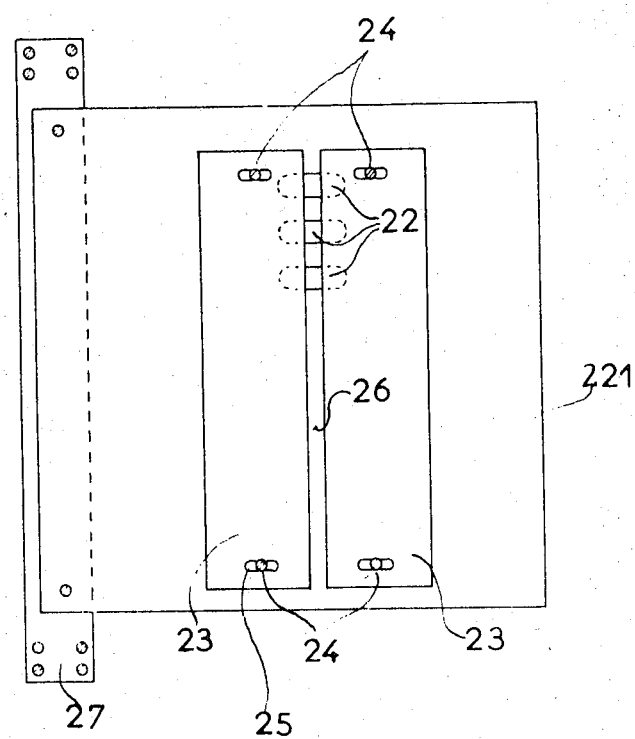

With reference to the drawings, the present invention will now be described pointing out the various objects and facets thereof, some of which will be apparent thereby and some of which will be understood and evident from the total context of this description. In the accompanying drawings, the same numbers and letters identify the same elements or similar elements functioning in the same manner are used and wherein:

FIG. 1 is a longitudinal section through the battery in accordance with a first embodiment;
FIG. 2 is a section along the line II—II of FIG. 1;
FIG. 3 is a section along the line III—III of FG. 1;
FIG. 4 is a longitudinal section through the battery in accordance with a second embodiment;
FIG. 5 is a section along the lin V—V of FIG. 4;
FIG. 6 shows a variant of the second embodiment;
FIG. 7 is a section along the line VII—VII of FIG. 6;
FIG. 8 shows the device used for depositing by projection the thin layers on the porous support to manufacture the battery in accordance with a tubular embodiment;
FIG. 9 shows in front view the removable mask used in the device shown in the preceding figure; and
FIG. 10 shows a front view of a slitted shield used independently or in conjunction with the mask of FIG. 9.

The battery of four cells shown in FIG. 1 comprises a porous support 1, for instance, of a porous ceramic material, in particular the mixed oxide $ZrO_2+CaO$ of a molar composition of 85 to 95 percent zirconium oxide and 5 to 15 percent calcium oxide, held within a gas-tight, solid partition 2 separating a gas-tight conduit 3 into two compartments 3a and 3b. The face of the support 1 on the side of the part 3a of the conduit is covered with a first thin layer comprising four distinct parts 4a, 4b, 4c, and 4d of an electron conducting porous material, for instance nickel, forming an electrode for each cell and a first electrode for the battery, i.e., particularly anodes. The rest of the first layer is formed of a solid material which does not conduct electrons, for instance a ceramic material.

The gas-tight and electronically non-conductive part of the first layer of which sections 5a, 5b, 5c, 5d, and 5e are shown in FIG. 1, 5c in FIG. 3 as well, and 5f and 5g in FIG. 2, completely surround (in a plane) the assembly of the first electrodes and isolates these electrodes from each other while being arranged in such a manner as to prevent the gas contained in the part 3b of the conduit from passing elsewhere than in the first electrodes and opposing in particular its direct passage into the part 3a of the said conduit.

It is obvious that only the surface of the porous support 1, covered by the porous parts forming first electrodes of the first layer, constitutes the active surface of the battery. Hence, it is advantageous to have a ratio of covered surface of electrodes to covered surface of a gas-tight layer as high as the requirements permit as concerning electric insulation and tightness to the gas contained in the part 3b of the conduit.

The ceramic material constituting the porous support 1 may be formed of any ceramic substance which is not an electronic conductor at the operating temperature of the battery and has a sufficient mechanical structure for a reasonable thickness. For example, in addition to the mixed oxide $ZrO_2+CaO$, other simple or mixed oxides are selected which are not electronic conductors, such as $Al_2O_3$, $MgO$, $SiO_2$, $ThO_2$, $MgO \cdot Al_2O_3$ (spinel) and the mixed oxide $ZrO_2$+a rare earth oxide.

The thickness of the support is of the order of 1 to 5 mm.

The porosity of the support is obtained in known manner, for instance by producing the support by sintering. In order to permit the battery to operate without being damaged in the event that the pressures of the gases flowing in the two compartments 3a and 3b of the conduit 3 are not equal; the pores of the largest opening of the support should not substantially exceed the total thickness of the layers covering the support.

The solid, gas-tight partition 2 separating the two compartments 3a and 3b is formed preferably of the same substance as that of which the refractory material of the porous support is made, but this substance must then constitute a material which is free of open porosity which could permit passage of the gases. The partition 2 may be in addition to that already mentioned a metal wall, for instance of stainless steel (17–24% Cr, balance Fe), in which the porous support is embedded and held in place by means of a gas-tight joint, for instance of refractory cement.

The gas-tight ceramic material in the first layer 5a to 5g is formed preferably of the same substance as that which forms the material of the porous support.

The first layer 4a, 4b, 4c, etc., is covered with a second layer, which is thin and entirely gas-tight, and comprises as many distinct portions 6a, 6b, 6c, and 6d of electrolyte as the number of elements which the battery has, i.e. in the FIG. 1 illustration, four. The balance of the said second layer is formed of an equal number of distinct portions of a material which is a good conductor of electrons, 7a, 7b, 7c, and 7d.

The electrolyte of components 6a to 6d consists, for instance, of a ternary mixed oxide $ZrO_2+CaO+MgO$, the electronically well conductive material 7a to 7d may be such as nickel aluminide. The electrolyte 6a to 6d consists also of other simple or mixed oxides other than the one indicated by way of example above, such as $ZrO_2+CaO$; $ZrO_2+MgO$; $ZrO_2+Y_2O_3$; $ZrO_2+Yb_2O_3$; $ZrO_2+Sc_2O_3$; and in general, $ZrO_2$+rare earth oxides, as well as $ThO_2+Y_2O_3$.

The electronically well conductive material 7a to 7d in the second layer can be formed of any gas-tight material which is a good electronic conductor and is simultaneously compatible with the materials constituting the anode, the cathode, and the electrolyte of the battery cells. This material should not allow the diffusion of the gases flowing in the anodic and in the cathodic conduit. Another desirable property of this material is to have a coefficient of thermal expansion only slightly different from those of the constituent materials of the porous support 1, of the gas-tight part of the first layer, i.e., 5a to 5g, and of the electrolyte 6a to 6d. This electronically well conductive material 7a to 7d of the second layer may be, for instance, in addition to that already mentioned, a "cermet," i.e., a composite material of both metallic and ceramic nature, e.g., having a base of nickel aluminide and aluminum oxide or same further containing silver.

As can be noted from FIGS. 1, 2, and 3, each of the parts 6a to 6d of the second, electrolyte-forming layer covers the major part of the surface of the first electrode 4a to 4d, respectively, of each corresponding cell; and each of the parts 7a to 7d of the second layer of material, which is a good conductor of electrons, covers the remainder of said surface. Furthermore, each of the parts 7a to 7d of the second layer covers the greatest portion of the surface of the insulating part of the first layer, i.e., 5a to 5g, separating the first electrode 4 of each cell from the first electrode of the preceding cell, however, without placing the said first electrode in electrical contact. Furthermore, the electrolyte layer 6a to 6d slightly extends over the gas-tight part 5a to 5g of the first layer to prevent the gases contained in each of the two parts of the conduit 3, i.e., 3a and 3b, from mixing when passing through the porous parts 4a to 4d of the first layer.

The second layer is itself covered with a third layer 8a to 8d formed of a material which is a good electronic conductor, for instance silver, comprising the same number of separate parts as cells in battery, i.e., 8a, 8b, 8c, 8d, etc., and forming the second electrodes for each of these cells in the battery.

As can be seen from FIGS. 1 and 2, each of the said second electrodes 8a to 8d covers the major part of the surface of the electrolyte 6a to 6d of the corresponding cell and is electrically connected with the first electrode of the following element via the electron conducting portion of the second layer 7b to 7d, respectively.

The second electrodes 8a to 8d are, of course, arranged in such a manner as to avoid any electrical contact between any two of these both directly and via the parts 7a to 7d of the second layer.

In the embodiment of the battery shown in FIGS. 1, 2, and 3, the compartment 3a is intended for the circulating of the comburant, e.g., oxygen, and the compartment 3b is intended for the circulation of the fuel, e.g., hydrogen.

The first electrodes 4a to 4d then operate as anodes and the second electrodes 8a to 8d as cathodes.

The anode 4a of the first cell is connected via the electron conductive portion 7a to the negative terminal of the battery from where the current collector 9 extends. The cathode 8d of the fourth and last cell is connected directly to the positive terminal of the battery from where the current collector 10 extends.

In order to operate the battery, it is sufficient to cause the fuel and the comburant to flow in their respective part of the conduit while maintaining the temperature of the assembly at a level necessary to obtain a sufficiently high conductivity of the electrolyte, i.e., at about 800° C.

The role of compartments 3a and 3b could be reversed; the fuel could be circulated in compartment 3a and the comburant in compartment 3b. In this case, the first electrodes 4a to 4d would operate as cathodes and the second electrodes 8a to 8d as anodes, the current collector 9 being then connected to the positive terminal and the collector 10 to the negative terminal. However, it has been observed that the anodes have a tendency, in certain cases, to separate when this latter arrangement is adopted and the arrangement in which the first electrodes 4a to 4d operate as anodes will, therefore, be preferred.

As anode, iron, nickel, cobalt or copper or alloys comprising iron, nickel, cobalt and/or copper can be used. As cathode, silver and nickel oxide with an addition of lithium oxide can be used.

As comburant not only oxygen can be used, but also air or a mixture of air and oxygen; while as fuel, in addition to hydrogen, carbon monoxide, water gas, hydrocarbons, gaseous mixtures containing $H_2$ CO, $H_2O$, $CO_2$ coming from the conversion of hydrocarbons, ammonia, hydrazine, etc., can be employed.

It is preferable in certain cases, particularly when the comburant or fuel (depending on the arrangement selected for the electrodes) exerts a corrosive action with respect to the material of the parts $7a$ to $7d$ of the second layer that the spaces between the second electrodes of the third layer $11a$ to $11d$ be entirely filled with a gas-tight, solid insulating material which withstands the action of the said gases and is compatible with the different materials with which it is in contact. One such material is the same as that which constitutes the gas-tight, solid material used for layers $5a$ to $5d$ of the first layer. In the battery shown in FIG. 1, the parts $7a$ to $7d$ are, thus, protected by the parts $11a$ to $11d$.

In accordance with the invention, the number of cells which a battery can have is in principle limited only by the dimensions of each cell and the maximum dimensions permissible for the entire battery. However, it should be noted that, depending on the desired current and voltage, it will be preferable either to have a small number of cells of large surface or a large number of cells of small surface for a given overall size.

The embodiment of the battery illustrated in FIGS. 4 and 5 has the advantage of making it possible to give to each cell a larger surface area for a set number of cells and size of the battery, thus, making it possible to obtain both higher current and higher voltage.

In this embodiment schematically represented by FIGS. 4 and 5, the porous support 1 is in the form of a tube on the outer wall of which there are arranged layers whose different parts form the first electrode ($4a$ to $4d$) the electrolyte ($6a$ to $6d$) and the second electrode ($8a$ to $8d$) respectively of each of the cells, as has been explained above.

In the present embodiment, it should be noted that the different parts of the layers corresponding to those previously described layers form concentric rings which have an arrangement similar to that described above.

Thus, in the four-cell battery of tubular shape shown in cross-section in FIG. 4, the porous support 1 is covered by the first layer formed of four first annular electrodes $4a$ to $4d$, in particular anodes, covering the major part of the surface of the porous support 1, the rest of said surface being covered by the solid, gas-tight rings of ceramic material $5a$ to $5e$. The second layer is formed of four rings of electrolyte $6a$ to $6d$ and four rings of good electronically conductive material $7a$ to $7d$ permitting the electrical connection of the anode of each element with the cathode of the following cell. The second electrodes $8a$ to $8d$ constituting the third layer also have the shape of axially circumferential annuli.

The solid, gas-tight partition 2 has the shape of a tube, for instance of stainless steel, in particular chrome ferrite steel (17–24% Cr, balance Fe), divided into two parts which fit respectively into each end of the tube constituting the porous support of ceramic material 1 and held rigidly together with the said porous support by refractory, gas-tight joints $1a$, which joints are of refractory cement capable of withstanding corrosion by the comburant and fuel.

The tube formed by the assembly consisting of the partition 2 and the porous support 1 covered with the layers constituting the cells of the battery separates the conduit 3 into two compartments $3a$ and $3b$, one peripheral and the other central, which are intended for the circulation of the gases, namely, the combustion supporting agent and the fuel, respectively.

It is to be noted that in this embodiment, the conduit 3 is unnecessary when air is used as combustion supporting agent, since it is then sufficient for the operation of the battery to have the fuel circuit in the conduit $3b$ at the necessary operating temperature of the battery, the latter being in contact with the atmosphere. It will also be noted that as a variant, several similar batteries can be placed within one and the same tight conduit 3, said batteries then having the same (comburant) compartment $3a$ in common.

As a variant, the partition 2 in which the support 1 is fastened both in the first and in the second embodiments of the battery can be eliminated, the support 1 being then contemplated in such a manner that it alone forms the partition of the conduit 3.

In accordance with another variant of the first or second embodiment, the battery has a metal partition, for instance of stainless steel, and particularly of chrome ferrite steel (17–24% Cr, balance Fe), at least a part of which is porous, the porosity being, for instance, obtained by the sintering of a powder, and covered by a porous layer of insulating refractory material. Such a variant has the advantage of allowing obtention of a battery having improved resistance to shock. Furthermore, as a sintered metal, and particularly stainless steel, generally has a greater mechanical strength for a given thickness than porous ceramic materials, this variant reduces the space taken up for a battery of a given power.

FIGS. 6 and 7 show the battery corresponding to this variant of the tubular embodiment.

As can be seen from these figures, the tubular partition 2 comprises a porous section $2a$ interposed between two solid, gas-tight sections 2 and the support 1 is made in the form of a layer of porous ceramic material, the thickness of which is sufficient to insulate the anodes of each cell electrically from partition 2.

The other elements of the battery are identical to those of the battery of FIGS. 4 and 5 and the operation of this battery is identical to that of the batteries shown in FIGS. 1 to 5.

It is to be noted that the battery, in accordance with the invention, operates at atmospheric pressure. It is obvious that it may also, particularly in accordance with its embodiments having a solid, gas-tight conduit 3, operate at a higher pressure which makes it possible to increase the reaction velocity and, therefore, the power of the cell.

With regard to the method of manufacture in accordance with the invention, the depositing of the ceramic materials will be preferably effected by projection with a torch, particularly a plasma torch. This manner of proceeding has the advantage of making it possible to obtain thin, tight, adherent layers under conditions which are easy to effect industrially. Further, the metal layers are deposited either by projection with a torch or by painting. Of course, the depositing of the thin layers can be effected in any suitable and known manner.

FIG. 8 shows by way of illustration and not of limitation a device which can be used for the plasma torch projection. This device comprises an electric motor 12 which, via a reducer 14, rotates a vertical shaft bearing on a removable graphite rod 13. The graphite rod is held in place by means of a chuck 15. The graphite rod serves to hold the porous tubular support $1g$ of the battery.

A removable mask consisting of several removable bars of stainless steel, in the present case eight in number, $16a$ to $16h$, held in place in a slide by means of screws and wedges which are also screwed. This mask can slide in vertical direction or pivot in rotation along and around a rod 17 fastened on the same base 18 as the electric motor 12 and the reducer 14 so as to be able to be placed in a plane parallel to the axis arranged vertically, holding it by means of the graphite rod 13 which is inserted into tube 19.

Once in position at a distance of about 1 mm. in front of the tube 19, the mask is blocked by means of the knurled clamping screws $20a$ and $20b$.

The gun 21 of the plasma torch is placed in the direction of tube 19 in front of the mask and guided in vertical displacement along a line parallel to the axis of the tube 19 by means of a suitable suspension system not shown in FIG. 8.

As can be noted in FIG. 9, the removable bars 16a to 16h form a horizontal grid which can be characterized by the dimensions a, b, c, and d, the meaning of which is indicated in FIG. 9. The mask shown in FIG. 9 has two end bars surrounding 6 inner bars, said bars being all of the same length.

With regard to the dimensions of these bars in the plane of FIG. 9, the six inner bars all have the same width c and the space b between all the bars is constant. The bars could also have different lengths provided that the smallest of these lengths is definitely greater than the diameter of the tube 19. Likewise, the width, number, and spacing of these bars may be of any suitable value, depending on the dimensions and number of cells which the battery is to have.

The manner in which the plasma torch is used in spraying or projecting the desired material is as follows: after having positioned the tube 19 and the mask as shown in FIG. 8, the tube 19 is turned around its vertical axis and the desired material is projected or sprayed by means of the gun 21 which is moved with a regular and relatively slow movement along a vertical parallel to the axis of the tube 19. Thus, a tube is obtained of generally thin and well-defined rings of uniform thickness, the width and spacing of which rings depend on the arrangement of the bars forming the mask. It can be seen that all dimensions and arrangement of rings can be easily obtained for a given spraying. Any relative, desirable position and staggered relationship of the masks can be obtained by modifying the arrangement of the mask as well as its position with respect to the support tube.

Another facet of the present invention resides in producing the various layers in a manner such that improved uniformity of the same is obtained. The apparatus illustrating this aspect of the invention is shown in FIG. 10. As described above, the spraying by plasma torch employs a disassemblable mask consisting essentially of a plurality of removable bars which, when the mask is used, are located in a plane parallel to the axis of the tube employed as support for the battery, the greatest length of said bars being arranged perpendicular to the axis of said tube. The above mask makes it possible, upon the projecting of the powders on the tube, to delimit the zones of the tube reached by the projection and those which are masked. The use of this mask makes it possible in general to obtain good results with reference in particular to the delineation of the different elements of the battery in the longitudinal direction of the support tube. However, in certain cases, particularly when using tubes of large diameter, e.g., of more than 1 cm., it is difficult to obtain the depositing of layers of perfectly uniform thickness in the longitudinal direction, despite the fact that the support tube is subjected to rotation around its axis when being sprayed. This is due to the fact that the thickness of the layers obtained depends to a large extent on the distance between the plasma torch gun and the wall of the tube on which the depositing is effected. In the event the gun is placed at a distance of about 10 cm. from the tube and the diameter of the latter is 1 cm., the variation between the distance to the gun from the generatrix of the tube closest to the gun and that one of the generatrices delimiting the zone of deposition at a given moment is of the order of 5%. This variation is 20% if the gun is placed at a distance of 5 cm. from the tube and if the tube has a diameter of 2 cm. The result is that the variation in parallax in the longitudinal direction, which is inevitable upon the spraying, results in the obtaining a decreasingly thinner ring or annulus, since the parts on the periphery of each ring correspond to a spray at points further away from the torch than those of the center of the rings and more so when sprayed at a more grazing angle.

Furthermore, it should be mentioned that the density of material in the cross-section of the plasma jet as well as the temperature thereof are not uniform. Therefore, this improvement makes it possible to enhance the homogeneity of the thickness of the layers by limiting the width of the zones exposed to the projection in the direction parallel to the axis of the tube.

Thus, the deposition of the layers by spraying of powders with a plasma torch onto the support tube is effected by masking certain zones of the tube by means of a mask which is interposed between the torch and the tube in which there is provided a slit parallel to the axis of the tube on which the spraying is effected. The slit is arranged opposite to the tube with respect to the plasma torch, so as to define the exposed zones and the masked zones both in the lateral direction of the tube and in its longitudinal direction.

FIG. 10 of the accompanying drawings shows, in front view, one embodiment of the mask used for the carrying out of the method in accordance with the invention.

This mask consists of a plate 211 of a suitable material, e.g., of stainless steel, in which there have been provided parallel elongated openings 22 of a spacing and width corresponding to the zones which it is desired to leave exposed to the projection.

In front of this plate there are fastened, on both sides of the exposed zone, two rectangular plates 23 consisting, for instance, of the same material and having the same thickness as the plate 221, which are fastened onto the plate 221 by clampscrews 24 which pass through elongated holes 25 so as to permit the lateral displacement of the said plates. There is, thus, defined a slit 26 parallel to the axis of the tube on which the deposition is effected. The slit has a width which varies in accordance with the position of the plates 23 so that the width of the exposed zones can be varied. The plate 221 is fastened on a support 27 arranged in such a manner as to permit the positioning of said plate in a plane parallel to the support tube of the battery. The plates 23 can also be arranged behind the plate 221. The mask is used similarly to that depicted in FIG. 9 and described above.

Of course, this mask may have a shape other than that shown in FIG. 10 provided that the lateral delimitation of the exposed zone of the tube is assured. Thus, the mask shown in FIG. 9 can be adapted by providing it with two rectangular plates placed parallel to the plane of the bars and against it, said two plates being capable of being moved apart from each other so as to produce a slit of variable width parallel to the axis of the tube and opposite it.

The dimensions of the slit which will be used depend on the diameter of the tube and the distance between the tube and the torch. For example, with a tube of a diameter of 1 cm. placed 10 cm. from the torch, very good results are obtained with a slit of a width of 0.5 cm. of course, the use of an arrangement which makes it possible to vary the width of the slit permits the adaptation of the mask to the spray conditions and to use with tubes of variable diameter.

The use of a mask in accordance with FIG. 10, in addition to having the advantages mentioned above, also has the advantage of making it possible to bring the plasma torch closer to the support tube on which the projection is effected without the latter being broken by thermal shock, since this mask also acts as a heat screen. In general, closeness of the torch to the tube is favorable for the obtaining of layers of good quality.

The preparing of a battery of a plurality of fuel cells and the carrying out of the process of this invention are explained in detail in the following examples which are merely illustrative and not to be construed as delimiting the total scope of the invention.

EXAMPLE I

A porous tube 19 of magnesia of a porosity of about 30% has the following dimensions: length 80 mm., outer diameter 12 mm., inner diameter 8 mm.

A plasma torch which is used is fed with a mixture of hydrogen and nitrogen. The gun is maintained about 8 cm. from the tube and moved, during the spraying, from top to bottom of the tube, with a uniform movement at a speed of 1.25 cm./sec.

A mask, as described in FIG. 9 is used, which is arranged in such a manner that the upper edge of the first bar from the top is exactly in the same horizontal plane as the top of the tube. This condition is maintained for all the sprayings except the fourth, for which the first bar from the top is 10 mm. below the top of the tube.

The different sprayings are carried out in accordance with the listed conditions appearing in Table 1 below when turning the tube 19 at 300 r.p.m. Thus, the data shown in the table below illustrates and summarizes the actual production of a battery.

outer electrode is caused to extend about 1 mm. over the ring of nickel aluminide of the second layer which is in contact with the inner electrode of the adjacent element so as to form an electric connection between the inner electrode (that is to say, the electrode directly in contact with the magnesia tube) of each cell and the outer electrode of one of the adjacent cells, the outer electrode of each cell being itself connected in the same manner to the inner electrode of the other adjacent cell, and so on.

After depositing of the different layers, it is merely ncessary to apply the current lead wires to the main cathode and the main anode of the battery. For this purpose, a silver wire of 0.4 mm. diameter is affixed to the outer electrode of the last cell, i.e., the cell whose silver electrode is no longer connected to the nickel electrode of an adjacent cell, and another silver wire of the same diameter to the layer of silver constituting the other terminal of the battery. The silver wires serving as current leads are held by means of brazing with silver and serveral turns of silver wire.

TABLE 1

| Consecutive No. of sprayings | Characteristics of the sprayed powder | Number of passes | Characteristic dimensions of the mask (in mm.) (see Figure 9) | | | | Number of inner bars | Number of rings obtained | Thickness of obtained rings (mm.) | Remarks |
|---|---|---|---|---|---|---|---|---|---|---|
| | | | a | b | c | d | | | | |
| 1 | Composition (in mol percent): ZrO₂, 88%/Particle size range in/μ CaO₂, 12%/30 to 70μ | ¹3 | 9 | 4 | 6 | 7 | 6 | 7 | 15 | |
| 2 | Nickel aluminide "Metco 404" | 1 | 3 | 6 | 4 | 11 | 6 | 7 | 0.05 | Treat with soda after spraying. |
| 3 | do | 1 | 8 | 4 | 6 | 8 | 6 | 7 | 0.05 | |
| 4 | Electrolyte, composition (in mol percent): ZrO₂, 90%/Particle size: Yb₂O₃, 10%/30 to 70μ | ¹6 | a+b=10 (no bar a) | 8 | b+d=2 (no bar d) | 8 | 7 | 8 | 0.30 | The last ring from the top does not cover any electrode and therefore does not operate as electrolyte. |
| 5 | Composition (in mols): ZrO₂, 88%/Particle size: CaO, 12%/30 to 70μ | ¹3 | 9 | 4 | 6 | 7 | 6 | 7 | 0.15 | |

¹ Spaced 5 minutes apart.

TABLE 2

[Number and dimensions of rings for a seven cell battery obtained by spraying onto a tubular porous magnesia support with the dimensions: inner diameter 8 mm., outer diameter 12 mm., length 80 mm.]

| Material | Designation as in Fig. 4 | Number of rings | Length in mm. | Thickness in mm. | Surface covered by one ring in cm.² |
|---|---|---|---|---|---|
| ZrO₂·CaO | 5 | 7 | 4 | 0.15 | 1.52 |
| Nickel aluminide (anode) | 4 | 7 | 6 | 0.05 | 2.26 |
| Nickel aluminide | 7 | 7 | 4 | 0.05 | 1.53 |
| ZrO₂·Yb₂O₃ (electrolyte) | 6 | 8 | 8 | 0.30 | 3.05 |
| ZrO₂·CaO | 11 | 7 | 4 | 0.15 | 1.56 |

The treatment with soda to which the layer of nickel aluminide deposited by spraying (second item in spraying sequence) is subjected is as follows: The magnesia tube with the nickel aluminide rings is immersed for an hour in a bath of sodium hydroxide solution of a concentration of 6 N, heated to 70° C., so as to attack and dissolve the aluminum from the aluminide layer. Thereupon, rinsing is effected with boiling distilled water, whereupon the excess soda which may have remained is neutralized by means of a solution of acetic acid maintained at room temperature, finally rinsing with distilled water. Drying is effected in an oven at 200° C. for 2 hours. In this way, very porous nickel electrodes are obtained.

After the spraying of the electrolyte (fourth item in spraying sequence), a coat of silver paint (Degussa, grade: Poliersilber 242 DG) is applied by brush to the electrolyte of each cell and allowed to dry in the air after the application so as to obtain a layer of a thickness of about 0.03 mm. forming the outer electrodes. Each The battery thus produced comprises 7 cells each of which has a useful surface of 2.26 cm.². At 800° C., with hydrogen as fuel flowing within the tube, and as comburant, air surrounding the tube, the open circuit voltage of the battery is 6.7 volts and the maximum power which it can deliver is 2.85 watts.

EXAMPLE II

A mask as described in FIG. 9 is used which is arranged for the obtaining of rings of a theoretical width of 7 mm., i.e., having horizontal, elongated openings of a width of 7 mm., on a support tube having a diameter of 10 mm. placed 1 mm. behind the mask. For a minimum distance of spraying of 80 mm., when spraying nickel aluminide, rings of an actual width of 8 mm. for an average thickness of 0.05 mm. are obtained. Contrariwise, if a mask as described in FIG. 10 is provided with a slit of a width of 5 mm. parallel to the axis of the support tube, rings of a width of 7.5 mm. are obtained, all other things being equal. It is, thus, seen that the use of the mask of FIG. 10 makes it possible to obtain a substantial improvement in the sharpness of the boundaries between the different parts of the layers which are deposited on the support tube.

The proportions of the various components in each layer may be in about the same relationship as in the drawings and with reference to the individual dimensions indicated in the spcification herein (see Table 2).

A preferred method for producing the anodes is as follows: Nickel oxide, (NiO) in powder form is projected onto the support by means of the plasma torch, as described herein. A practically completely gas-tight layer is, thus, obtained. The projection is preferably effected in such a way as to obtain a layer of a thickness between 20 and 50 microns. The other layers are then deposited in the manner described. When the battery is placed in use, the reductive action of the fuel gas reduces the nickel oxide to metallic nickel. The anode, thus, assumes its final form, i.e., it is transformed into a layer of nickel of homogeneous and well-defined porosity. This porosity, which depends only on the ratio between the specific volume of the nickel oxide and that of the nickel, is reproducible. The obtaining of the final form of the anode is, thus, particularly easy. Good results are obtained with a powder having a particle size of between 40 and 70 microns.

It should be noted that the reduction of the layer of nickel oxide to nickel is very rapid. When a cell is placed under temperature, during which operation the temperature of the surrounding temperature is raised to 800° C., approximately, in one-half hour to three-quarters of an hour, the anode of the cell is formed completely by the time when the operating temperature is reached. The anodes, thusly obtained, have as good a behavior as the sodium hydroxide treated nickel anodes described in Example I.

In the event that the anode is made by deposition of nickel oxide and subsequent reduction in situ of the layer of nickel oxide to porous metallic nickel, the adherence of the anode to the electrolyte is substantially improved by interposing between the anode and the electrolyte, by deposition in the same manner as in the case of the other layers, a layer formed of a mixture of nickel oxide and electrolyte material, for instance in a proportion of 25% by weight nickel and 75% by weight electrolyte. The active surface of the anode is in this way also improved. The mixture layer is deposited in such a manner as to cover precisely the layer of nickel oxide which is intended to constitute the anode. This mixed layer preferably has a thickness of the same order of magnitude as the anode.

When working or using a ceramic support and when the anode is produced by reduction of nickel oxide, the gas-tightness of the electrolyte layer can be improved (desirable in certain cases) in the following manner, particularly if the electrolyte layer is relatively thin.

After the deposition of the first layer on the support, the electrolyte portion is deposited as the second layer before depositing the electron conductive portion of the second layer. The free surface of the electrolyte is then impregnated with a solution by dipping, spraying with the solution in greater or lesser dispersed condition, brushing, or any other known means. This solution can be, for example, an aqueous solution of a decomposable zirconium salt which decomposes under the action of heat to form zirconium oxide. It is advantageous to use (making it possible to obtain even better results) a solution of a mixture of a decomposable zirconium salt and a decomposable salt of a metal the oxide of which, stabilizes the cubic phase of zirconium oxide in a proportion suitable for the obtaining of a cubic solid solution identical or similar to the electrolyte by decomposition and heat treatment. For example, an aqueous solution of zirconyl nitrate $ZrO(NO_3)_2$ and calcium nitrate $Ca(NO_3)_2$ is employed in a concentration between 5 and 30% by weight of salt, in such proportion that the molecular ratio of the oxides in the solid solution obtained after decomposition and heat treatment is 88 mols $ZrO_2$ to 12 mols CaO. A mixture in aqueous or organic solution of suitable thermo-decomposable salts such as chlorides, acetates, citrates, etc., of zirconium, and elements the oxides of which stabilize the cubic phase of zirconium oxide (for instance Ca, Mg, rare earths, Sc and Y can also be used). The thermal decomposition of the salts is then effected by gradually heating in air, for instance, up to a temperature of 1000° C., which temperature is maintained for several tens of minutes, for instance, half an hour. This treatment of electrolyte impregnation and decomposition of the salt(s) is repeated several times, for instance 3 to 5 times. For this purpose, there are preferably used several solutions of decreasing concentration, the solution of highest concentration being used first. The treatment is terminated by heating for a few hours at a temperature which effects the sintering of the resultant oxides, for instance, 1300° C.

In summary, according to the invention, the present battery is characterized by the fact that it comprises a porous support covered with a first layer comprising alternately components of a conductor material for electrons, each component forming the first electrode of one of the cells. Next, gas-tight components of an electronic non-conductive material are provided which gas-tight components form the insulation between two adjacent electrodes. The first layer is itself covered with a second layer. This second layer alternately comprises components each forming the electrolyte of one of the cells and covering the major part of the first electrode of the corresponding cell and a part of the insulation separating it from the first electrode of one of the adjacent cells; and components of an electronically conductive gas-tight material each covering a major part of the insulation separating two electrodes and the part not covered by the electrolyte of one of these electrodes. The second layer itself is covered with a third layer comprising separate parts of an electronically conductive material each covering the major part of the electrolyte of one of the cells and forming the second electrode thereof. In the third layer, one of the ends of the electronically conductive material is connected to the electronically conductive part of the second layer partially covering the first electrode of the adjacent cell, the other end being free, all in such a manner as to form a battery constituting at least a part of a gas-tight partition defining at least one compartment intended for the circulation of a fuel or combustion supporting gas.

Thus, the cells forming the battery are rigidly connected to a common support. Such an arrangement has the advantage that the strength of the assembly depends in practice only on the strength of the support, which is made of a single piece and in practice can be as strong as desired. Furthermore, since all the layers of the different materials covering this support can be extremely thin, the fragility of thermal shock of the assembly depends substantially only on that of the support, which would not be true if the said layers were of substantial thickness. Thus, it is easier to produce a battery having good resistance to thermal shock.

Another aspect of this invention is in a method of manufacturing fuel-cell batteries. This process is characterized by (a) depositing on a porous support a first layer comprising alternately parts of an electronic conductor material each forming the first electrode of one of the cells and gas-tight components of an electronically non-conductive material in such a manner that the gas-tight parts each form insulation between the electrodes, (b) depositing on said first layer, a second layer comprising alternately parts each forming the electrolyte of one of the cells so that each of said parts covers the major portion of the first electrode of the corresponding cell and a minor portion of the insulation separating it from the first electrode of one of the adjacent cells, and then parts of an electronically conductive gas-tight material so that each of said latter parts covers the major portion of the insulation separating two electrodes and the portion not covered by the electrolyte of one of said electrodes, and (c) depositing on the second layer, thus, formed a third layer comprising separate parts of an electronically conductive material each forming the second electrode of one of the cells so that each of said last parts covers the major portion of the electrolyte of one of the cells, and one of its ends is connected to the electronic conductive part of the second layer which partially covers the first electrode of the adjacent cell.

Thus, the process in accordance with the invention consists in successively depositing on the porous support thin layers presenting an alternation of components having the desired properties, said components being arranged in such a manner as to form a battery of several cells.

What is claimed is:

1. As an article of manufacture, a battery of fuel cells which cells have a solid electrolyte, comprising
   (a) a porous, insulated support;
   (b) a first layer of
      (1) separate components of electronically conductive material forming a plurality of electrodes, each electrode being separated from the next adjacent electrode;
      (2) separated components of a gas-tight, electronically non-conductive material between adjacent electrodes isolating each electrode;
   (c) a second layer of
      (1) separated components of an electrolyte for each cell, each of said electrolytes overlaying the major portion the electrode of each of the corresponding cells and a portion of the non-conductive components of said first layer;
      (2) separated components of an electronically conductive gas-tight material overlaying a major portion of said non-conductive, insulating components of said first layer and a minor portion of the electrode of the first layer not covered by said electrolyte components to furnish a conductive path for an anode of one cell with a cathode for another, adjacent cell;
   (d) a third layer of
      (1) an electronically conductive material covering the major portion of the electrolyte for each cell of the second layer, said third layer forming a second electrode for said cell, said electrode partially also overlaying the electronically conductive components of said second layer;
   (e) a terminal for each pole of the battery; and
   (f) a surface of said insulated, porous support defining at least a part of one conduit.

2. As an article of manufacture, the battery of claim 1, wherein one surface of the porous support defines a part of conduit for a fuel and the other surface overlaid with the first layer and additional layers define a part of another conduit for a comburant.

3. As an article of manufacture, the battery of claim 1 wherein one surface of porous surface defines a tube conduit.

4. As an article of manufacture, the battery of claim 1, wherein the surface of the porous support overlaid with the first layer and additioanl layers defines an inside surface of a conduit.

5. As an article of manufacture, the battery of claim 1, wherein the porous support is a ceramic refractory material.

6. As an article of manufacture, the battery of claim 1, wherein the porous support is a ceramic refractory material being cubic phase stabilized zirconium oxide, alumina, magnesia, silica, thoria, or $MgO \cdot Al_2O_3$ spinel.

7. As an article of manufacture, the battery according to claim 1, wherein the porous support consists of a composite porous support of a porous metal overlaid with the porous ceramic refractory material.

8. As an article of manufacture, the battery of claim 7, wherein the porous metal is a stainless steel.

9. As an article of manufacture, the battery of claim 7, wherein the conductive component of the first layer is nickel, iron, cobalt, copper or alloys of these metals.

10. As an article of manufacture, the battery of claim 1, wherein the conductive third layer is silver, or a mixture of nickel oxide and lithium oxide.

11. As an article of manufacture, the battery of claim 1, wherein the electronically non-conductive gas-tight material of the first layer is a ceramic refractory material being cubic phase stabilized zirconium oxide, alumina, magnesia silica thoria or $MgO \cdot Al_2O_3$ spinel.

12. As an article of manufacture, the battery of claim 1, wherein the electrolyte in the second layer is a mixed oxide of thorium and yttrium oxide or mixed oxides of zirconium oxide and at least one oxide selected from the group consisting of calcium, magnesium, yttrium, ytterbium, scandium, or an oxide of the other rare earths elements.

13. As an article of manufacture, the battery according to claim 1, wherein the electronically conductive material of the second layer is nickel aluminide, cermet of nickel aluminide and alumina, cermet of nickel aluminide and alumina containing silver.

14. As an article of manufacture, the battery according to claim 1, wherein the average diameter of the pores of the porous support does not substantially exceed the total thickness of the layers on its surface.

15. As an article of manufacture, the battery according to claim 1, wherein the second layer not covered by the electrodes of the third layer is covered by a gas-tight, electrically insulating material resistant to corrosion of comburant and fuel.

16. As an article of manufacture, the battery according to claim 15, wherein the gas-tight material of the third layer is a ceramic refractory material being cubic phase stabilized zirconium oxide, alumina, magnesia, silica, thoria, or $MgO \cdot Al_2O_3$ spinel.

17. A tubular battery of fuel cells which cells have a solid electrolyte, comprising:
   (a) a porous, insulated tubular support disposed within a conduit having at least one communicating passage for a fuel gas;
   (b) a fuel gas disposed within the passage for the same;
   (c) a first layer surrounding axially and circumferentially said tubular support, wherein said first layer consists essentially of
      (1) separated components of electronically conductive material forming a plurality of electrodes, each electrode being separated from the next adjacent electrode,
      (2) separated components of gas-tight, electronically non-conductive material between adjacent electrodes isolating each electrode,
   (d) a second layer axially circumferential to said tubular support and said first layer consisting essentially of
      (1) separated components of an electrolyte for each cell, each of said electrolytes overlaying the major portion of the electrode of each of the corresponding cells and a portion of the non-conductive layer of said first layer,
      (2) separated components of an electronically conductive gas-tight material overlaying a major portion of non-conductive, insulating components of said first layer and a minor portion of the electrode of said first layer not covered by said electrolyte components;
   (e) a third layer of
      (1) an electronically conductive material each covering the major portion of the electrolyte of the second layer, said third layer forming the second electrode for said cell, said electrode partially overlaying the electronically conductive components of said second layer;
   (f) a terminal for each pole of the battery; and
   (g) a surface of said insulated, porous support defining at least a part of one conduit.

18. A battery of fuel cells which cells have a solid electrolyte according to claim 17, wherein the porous, insulated support is disposed within a conduit having at least two passages each non-communicating with the other, at least one passage being for a fuel gas and at least one passage being for a comburant, said fuel being disposed within the passage for the same and said comburant being disposed within the passage for same.

19. The battery of claim 1, wherein an insulating means as part of the third layer is spaced between each adjacent second electrode.

20. The tubular battery of claim 17, wherein an insulating means as part of the third layer is spaced between each adjacent second electrode.

References Cited

UNITED STATES PATENTS 3,402,230   9/1968   White _____ 136—86

WINSTON A. DOUGLAS, Primary Examiner

H. A. FEELEY, Assistant Examiner